United States Patent
Hwang et al.

(10) Patent No.: US 12,093,298 B2
(45) Date of Patent: Sep. 17, 2024

(54) APPARATUS AND METHOD FOR TRAINING MODEL FOR DOCUMENT SUMMARIZATION

(71) Applicant: SAMSUNG SDS CO., LTD., Seoul (KR)

(72) Inventors: Bong-Kyu Hwang, Seoul (KR); Ju-Dong Kim, Seoul (KR); Jae-Woong Yun, Seoul (KR); Hyun-Jae Lee, Seoul (KR); Hyun-Jin Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 330 days.

(21) Appl. No.: 17/828,400

(22) Filed: May 31, 2022

(65) Prior Publication Data
US 2022/0382793 A1    Dec. 1, 2022

(30) Foreign Application Priority Data

May 31, 2021    (KR) .......................... 10-2021-0070040

(51) Int. Cl.
*G06F 40/295*    (2020.01)
*G06F 16/34*    (2019.01)
(Continued)

(52) U.S. Cl.
CPC .......... *G06F 16/345* (2019.01); *G06F 40/205* (2020.01); *G06F 40/284* (2020.01); *G06F 40/295* (2020.01); *G06F 40/30* (2020.01)

(58) Field of Classification Search
CPC .... G06F 16/345; G06F 40/205; G06F 40/284; G06F 40/295; G06F 40/30; G06F 40/56; G06F 40/216; G06N 20/00
See application file for complete search history.

(56) References Cited

U.S. PATENT DOCUMENTS 11,860,684 B2 *    1/2024    Yang ..................... G06N 3/045
11,941,348 B2 *    3/2024    de Oliveira ............ G06F 40/35
(Continued)

OTHER PUBLICATIONS

Thottempudi; A Visual Narrative of Ramayana using Extractive Summarization, Topic Modeling and Named Entity Recognition; ACI'21: Workshop on Advances in Computational intelligence at ISIC 2021, Feb. 25-27, 2021, Delhi, India. (Year: 2021).*

*Primary Examiner* — Abul K Azad
(74) *Attorney, Agent, or Firm* — Sughrue Mion, PLLC (57) ABSTRACT

An apparatus for training a document summarization model includes a token generation unit, a named entity recognition unit, and a model training unit. The token generation unit generates document tokens and summarization tokens. The named entity recognition unit assigns named entity token status to a summarization token, recognized as a named entity through NER, and assigns non-named entity token status to the other tokens. The model training unit obtains feature vectors by inputting the plurality of document tokens into an encoder inside a document summarization model, obtains a first loss related to the named entity token, a second loss related to the other tokens, and a total loss using a weighted value by inputting the feature vectors, the summarization tokens, the named entity token, and the non-named entity token into a decoder inside the document summarization model, and trains the document summarization model on the basis of the total loss.

12 Claims, 7 Drawing Sheets

(51) Int. Cl.
*G06F 40/205* (2020.01)
*G06F 40/284* (2020.01)
*G06F 40/30* (2020.01)

(56) References Cited

U.S. PATENT DOCUMENTS

2020/0142917 A1* 5/2020 Paulus .................... G06N 3/044
2022/0222489 A1* 7/2022 Liu ......................... H04L 51/18

* cited by examiner

APPARATUS AND METHOD FOR TRAINING MODEL FOR DOCUMENT SUMMARIZATION

CROSS REFERENCE TO RELATED APPLICATION(S) AND CLAIM OF PRIORITY

This application claims the benefit under 35 USC § 119 of Korean Patent Application No. 10-2021-0070040, filed on May 31, 2021, in the Korean Intellectual Property Office, the entire disclosure of which is incorporated herein by reference for all purposes.

BACKGROUND

1. Field

The present disclosure relates to technology for training a document summarization model such that factual consistency thereof is improved.

2. Description of the Related Art

Document summarization models receive a document made up of texts such as news articles, book paragraphs, and the like. In the modern society in which a quantity of information to be treated increases exponentially, such document summarization models able to summarize documents in this manner have inexhaustible uses.

However, related-art document summarization models, while trained to summarize input documents to rapidly provide documents having natural and plausible sentence structures, may lack accuracy. As a result, pieces of information, such as proper nouns or numerical information, that should not be changed in the summarizing process, may be altered, resulting in a problem in which the summarization documents may contain misleading information.

For this reason, a new training technology capable of improving factual consistency with respect to documents for the models is required.

The information disclosed in the Background section is only provided for a better understanding of the background and should not be taken as an acknowledgment or any form of suggestion that this information forms prior art that would already be known to a person having ordinary skill in the art.

SUMMARY

Disclosed embodiments are intended to additionally make good use of information relevant to a named entity when training a document summarization model, and to improve factual consistency of the model.

An apparatus for training a document summarization model according to an embodiment to be disclosed may include: a token generation unit generating a plurality of document tokens corresponding to document data and a plurality of summarization tokens corresponding to summarization data for the document data; a named entity recognition unit assigning named entity token status to the summarization token, recognized as a named entity through named entity recognition (NER), from among the plurality of summarization tokens, and assigning non-named entity token status to the other tokens; and a model training unit, wherein the model training unit is configured to: obtain a plurality of feature vectors by inputting the plurality of document tokens into an encoder inside a document summarization model; obtain a first loss related to the token recognized as the named entity, a second loss related to the other tokens, and a total loss in which the first loss and the second loss are summed up using a weighted value by inputting the plurality of feature vectors, the plurality of summarization tokens, the named entity token, and the non-named entity token into a decoder inside the document summarization model; and train the document summarization model on the basis of the total loss.

The first loss may be calculated by inputting a first token class, output from the decoder by inputting the feature vector for the token recognized as the named entity, the plurality of summarization tokens, and the named entity token, as well as a correct answer label for the token recognized as the named entity, as an input of a preset loss function; and the second loss may be calculated by inputting a second token class, output from the decoder by setting feature vectors for the other tokens, the plurality of summarization tokens, and the non-named entity token, and the correct answer labels for the other tokens, as an input of the loss function.

The named entity recognition unit may subdivide the token recognized as the named entity into a plurality of types, and assigns the named entity token that is different according to each type; and the first loss may be calculated by summing up a plurality of losses, associated with each token subdivided according to each type, using a weighted value.

The model training unit may update training parameters of the encoder and training parameters of the decoder on the basis of the total loss.

The training model for training a document summarization model may further comprise a mask (processing) unit replacing at least a portion of the tokens recognized as named entities with the mask token.

The mask (processing) unit may replace each of the tokens recognized as the named entities with the mask token according to a preset probability.

A method of training a document summarization model, the method according to one disclosed embodiment comprising the steps of: generating a plurality of document tokens corresponding to document data, and a plurality of summarization tokens corresponding to summarization data for the document data; assigning a named entity token status to the summarization token, recognized as a named entity from among the plurality of summarization tokens, and assigning non-named entity token status to the other summarization tokens; inputting the plurality of document tokens into an encoder within the document summarization model and obtaining a plurality of feature vectors; inputting the plurality of feature vectors, the plurality of summarization tokens, the named entity token, and the non-named entity token into a decoder within the document summarization model, and obtaining a first loss related to the token recognized as the named entity, a second loss related to the other tokens, and a total loss in which the first loss and the second loss are summed up by a weight value; and training the document summarization model on the basis of the total loss.

The step of assigning the token may subdivide the type of token recognized as the named entity, assign the named entity token different according to each type, and calculate the plurality of losses associated with the different named entity tokens, the first loss may be calculated by summing up the plurality of losses associated with each token subdivided according to the type together with the weight value.

The step of training the document summarization model may include updating training parameters of the encoder and training parameters of the decoder on the basis of the total losses.

The step of training the document summarization model may further include a step of, after the step of assigning the token, replacing at least some recognized as the named entities with the mask tokens.

The replacing step includes replacing each of the tokens recognized as the named entity with the mask token according to a preset probability.

According to the disclosed embodiments, not by simply training the model using the document data alone, but by dividing words composing contents of each document into uses for the named entity and the non-named entity and additionally using the information about the words to train the model, important portions of the document data are incorrectly summarized. Accordingly, it is possible to prevent reliability of the summarization data from being damaged.

According to the disclosed embodiments, by giving a weighted value to the words corresponding to the named entity when the model is trained, it is possible to more accurately train the model with respect to the important portions of document data.

According to the disclosed embodiments, by masking at least some of the words corresponding to the named entity, the model infers the summarization data by further concentrating information about newly input document data than accumulated training experience, factual consistency of the model can be improved.

BRIEF DESCRIPTION OF THE DRAWINGS

The above and other objectives, features, and advantages of the present disclosure will be more clearly understood from the following detailed description, taken in conjunction with the accompanying drawings, in which.

DETAILED DESCRIPTION

Hereinafter, specific embodiments will be described with reference to the accompanying drawings. The following detailed description is provided to assist in a comprehensive understanding of at least one of a method, a device, and a system to be described herein. However, the detailed description is merely exemplary, and the present disclosure is not limited thereto.

In the description of embodiments, a detailed description of known technologies related to the present disclosure will be omitted in the situation in which the subject matter of the present disclosure may be rendered rather unclear thereby. Terms to be used hereinafter will be defined in consideration of functions thereof in embodiments of the present disclosure, but may vary depending on the intentions of users or operators, as well as practices. Therefore, the terms shall be defined on the basis of the descriptions throughout the specification. The terms used in the detailed description shall be interpreted as being illustrative, while not being limitative, of embodiments. Unless clearly used otherwise, a singular form includes a plural meaning. It shall be understood that expressions such as "comprise," "include," and "have" used herein are for indicating certain features, numbers, steps, operations, elements, a part or combinations thereof and are not to be interpreted as excluding the presence or possibility of one or more features, numbers, steps, operations, elements, a part or combinations thereof other than the above.

In the following description, terms such as "transmitting", "communicating", "sending", "receiving", or the like of a signal or information include that a signal or information is not only directly transmitted from one component to another component but also indirectly transmitted via another component.

In particular, "transmitting" or "sending" a signal or information to a component is to indicate a final destination of the signal or the information, rather than indicates a direct destination. This is equally applied to "reception" of the signal or the information. Further, in the present specification, meaning that two or more pieces of data or information are "related" is that, when a piece of data (or information) is acquired, at least a portion of other data (or information) can be acquired on the basis of such acquirement.

In addition, terms, such as first and second, may be used to describing a variety of components, but the components are not limited by such terms. Such terms may be used to distinguish one component from other components.

For example, a first component may be referred to as a second component and, in a similar manner, a second component may be referred to as a first component without departing from the scope of the present disclosure.

Figure 1:
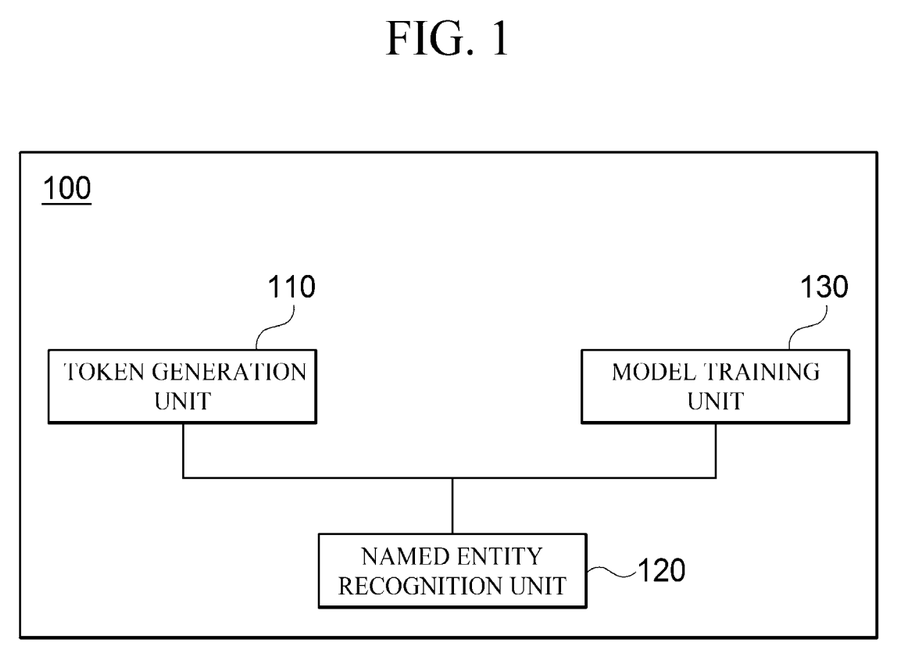
FIG. 1 is a block diagram illustrating an apparatus for training a document summarization model according to an embodiment.

FIG. 1 is a block diagram illustrating an apparatus 100 for training a document summarization model according to an embodiment.

As illustrated, the apparatus 100 for training a document summarization model according to an embodiment includes a token generation unit 110, a named entity recognition unit 120, and a model training unit 130.

In the illustrated embodiment, components can have different functions and capabilities in addition to the following, and can include additional configuration in addition to the following.

Further, in an embodiment, a token generation unit 110, a named entity recognition unit 120, and a model training unit 130 may be embodied using one or more devices that are physically divided, or may be embodied by one or more processors or a combination of one or more processors and software, and may not be clearly divided in detailed operations unlike the illustrated examples.

The token generation unit 110 generates a plurality of document tokens corresponding to document data, and a plurality of summarization tokens corresponding to summarization data relative to the document data.

In the following embodiments, the token generation process of the token generation unit 110 will be designated as 'tokenization', and the token generation unit 110 can perform tokenization on the basis of various language units according to the embodiment.

For example, the token generation unit 110 can divide components making up of the document data or the summarization data in units of a space, and generate a plurality of document tokens or summarization tokens. As another example, the token generation unit 110 can divide the components making up of the document data or the summarization data in units of a morpheme, and generate a plurality of document tokens or summarization tokens. However, it should be noted that, in addition to this configuration, the token generation unit 110 can generate a token on the basis of various language units.

The named entity recognition unit 120 assigns a named entity token status to a token recognized as a named entity among the plurality of summarization tokens by means of named entity recognition (NER), and assigns non-named entity token status to the other tokens.

Specifically, the named entity recognition unit 120 performs named entity recognition according to a preset recognition criterion in units of the summarization token, causes each token recognized as the named entity to be assigned by the named entity token corresponding to the recognized token, and allows each the other token recognized as the non-named entity to be assigned by the non-named entity token corresponding to the recognized the other token.

In this case, the criterion of the named entity recognition can be previously set in various ways. For example, the named entity recognition unit 120 can recognize the summarization token, corresponding to the summarization data component whose part of speech is a noun among the plurality of summarization tokens, as the named entity. As another example, the named entity recognition unit 120 can recognize the summarization token, corresponding to the summarization data component whose part of speech is a postpositional particle, as the named entity.

In addition, the named entity recognition unit 120 can recognize a summarization token, corresponding to a summarization data component classified as a stopword in a dictionary, as a non-named entity, and can recognize all the remaining summarization tokens as the named entity. However, the aforementioned embodiments of the named entity recognition are given as an example, and it should be noted that, in addition thereto, the named entity recognition unit 120 can perform the named entity recognition depending on various recognition criteria according to an embodiment.

According to an embodiment, the named entity recognition unit 120 can subdivide a type of the token recognized as the named entity into a plural of types, and can assign to the named entity tokens that are different according to respective types.

This corresponds to a pre-processing process in which, when the document summarization model is trained at the model training unit 130 to be described below, the training is advanced according to a difference in a level of importance and according to a type of the token recognized as the named entity, and thereby making it possible to perform the training that places emphasis on the named entity having a type desired by a user.

For example, the named entity recognition unit 120 assigns a first type of named entity token status to a token whose part of speech is a noun among the tokens each recognized as the named entity, and assigns a second type of named entity token status to a token whose part of speech is an adjective among the tokens each recognized as the named entity, so that it can be subject to training by making it possible for the document summarization model to be trained in the training process to be described below by placing further emphasis on the summarization token to which the first type of named entity token status is assigned.

The model training unit 130 inputs a plurality of document tokens into an encoder within the document summarization model, and acquires a plurality of feature vectors.

Afterwards, the model training unit 130 inputs a plurality of feature vectors, a plurality of summarization tokens, a named entity token, and a non-named entity token into a decoder within the document summarization model, thereby obtaining a first loss relevant to the token recognized as the named entity, a second loss relevant to the other token, and a total loss in which the first loss and the second loss are obtained by weighted sum.

According to an embodiment, at least one of an encoder and a decoder within the document summarization model may include an artificial neural network (ANN) structure. For example, at least one of the encoder and the decoder within the document summarization model may include a recurrent neural network (RNN) structure, and particularly a long short-term memory (LSTM) structure. As another example, the at least one of the encoder and the decoder may include a transformer based structure or a structure based on bidirectional encoder representations from transformers (BERT). However, it is given as example, and it is apparent that, in addition thereto, at least one of the encoder and the decoder within the document summarization model can include various artificial neutral network structures.

According to an embodiment, the first loss can be calculated by inputting the feature vector of the token recognized as the named entity, the plurality of summarization tokens, and the plurality of named entity tokens, and by inputting the correct answer label for the token recognized into the preset loss function.

In this case, the loss function may be an arbitrary function having a value in proportion to a degree of inconsistency between the first token class for each token recognized as the named entity and the correct answer label for each token recognized as the named entity. For example, the loss function may be a cross-entropy function. However, in addition thereto, various functions may be used as the loss function.

Moreover, if a type of the token recognized as the named entity at the named entity recognition unit 120 is subdivided into a plurality of types and then a different named entity token status is assigned according to type, the first loss can be calculated by weighing a plurality of losses related to each token subdivided according to the type.

For example, when the token recognized as the named entity is subdivided into three types, the first loss can be calculated on the basis of Equation 1 below.

$$L_1 = \alpha L(y_\alpha, s'_\alpha) + \beta L(y_\beta, s'_\beta) + \gamma L(y_\gamma, s'_\gamma) \quad (1)$$

Here, $L_1$ indicates a first loss, L indicates a loss function, $y_\alpha$, $y_\beta$ and $y_\gamma$ indicate first token classes for the tokens subdivided into three types, $s'_\alpha$, $s'_\beta$ and $s'_\gamma$ indicate correct answer labels for the tokens subdivided into three types, and $\alpha$, $\beta$ and $\gamma$ indicate weighted values related to the tokens subdivided into three types.

Meanwhile, according to an embodiment, the second loss can be calculated by inputting feature vectors of the other tokens, a plurality of summarization tokens, and a plurality of non-named entity tokens, and by setting a second token class inside the document summarization model and correct answer labels for the other tokens as inputs of the preset loss function.

In this case, the loss function may be an arbitrary function having a value that is in proportion to a degree of inconsistency between the second token class for each token recognized as the non-named entity and the correct answer label for each token recognized as the non-named entity. For example, the loss function may be a cross-entropy function. However, in addition thereto, various functions may be used as the loss function.

Meanwhile, according to an embodiment, the total loss can be calculated on the basis of Equation 2 below.

$$L_{tot} = \lambda L(t_{ne}, s'_{ne}) + L(y_{nne}, s'_{nne}) \quad (2)$$

Here, $L_{tot}$ indicates a total loss, $L(y_{ne}, s'_{ne})$ indicates a first loss, $y_{ne}$ indicates a first token class for the token recognized as the named entity, $s'_{ne}$ indicates a correct answer label for the token recognized as the named entity, $\lambda$ indicates a weighted value of the first loss, $L(y_{nne}, s'_{nne})$ indicates a second loss, $y_{nne}$ indicates a second token class for the token recognized as the non-named entity, and $s'_{nne}$ indicates a correct answer label for the token recognized as the non-named entity.

Afterwards, the model training unit 130 trains the document summarization model on the basis of the obtained total loss.

According to an embodiment, the model training unit 130 can update training parameters of the encoder and training parameter of the decoder within the document summarization model on the basis of the obtained total loss.

According to an embodiment, the model training unit 130 can terminate the training of the document summarization model when the total loss is less than a preset threshold, and can restart the training of the document summarization model on the basis of new document data and new summarization data when the total loss exceeds the preset threshold.

In this case, the document data and the summarization data may be data included in a training data set that is stored in a storage space inside the apparatus 100 for training a document summarization model or a database separately provided outside the apparatus 100 for training a document summarization model, and the model training unit 130 can iterate the training for the document summarization model on the basis of a batch size preset from the training data set, an iteration number, and so on.

Figure 2:
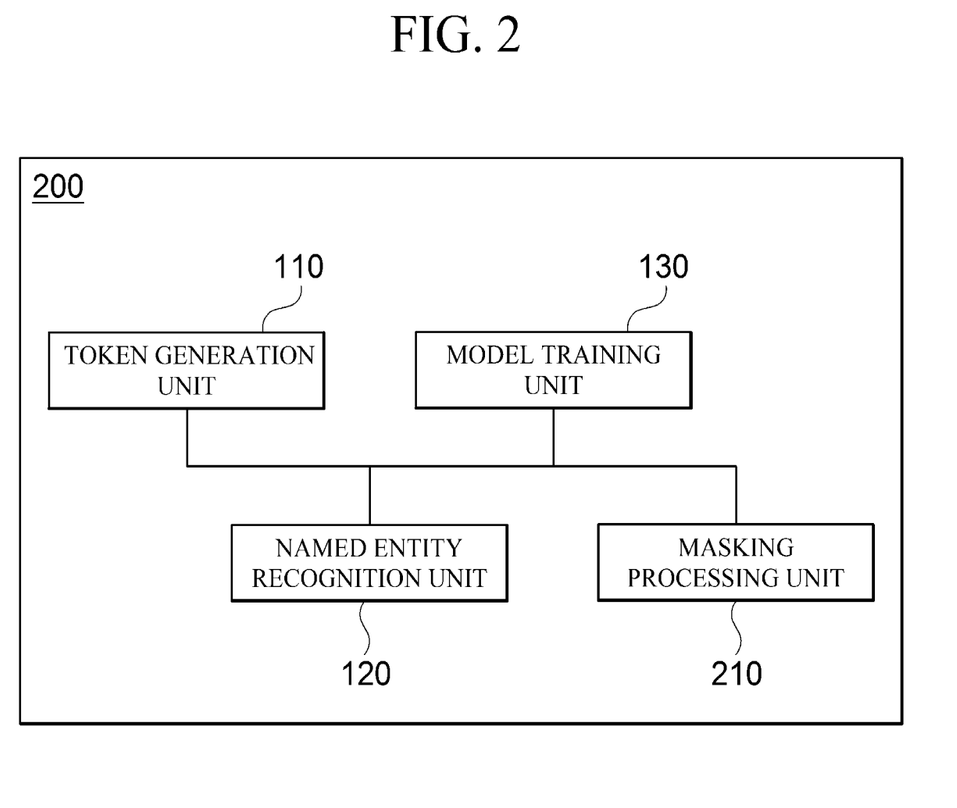
FIG. 2 is a block diagram illustrating an apparatus for training a document summarization model according to an additional embodiment.

FIG. 2 is a block diagram illustrating an apparatus 200 for training a document summarization model according to an additional embodiment;

As illustrated, the apparatus 200 for training a document summarization model according to an additional embodiment further includes a masking processing unit 210 in addition to the token generation unit 110, the named entity recognition unit 120, and the model training unit 130.

In the illustrated embodiment, components can have different functions and capabilities in addition to the following, and can include additional configuration in addition to the following.

Further, in an embodiment, the token generation unit 110, the named entity recognition unit 120, the model training unit 130, and the masking processing unit 210 can be embodied using at least one or more devices that are physically divided, or can be embodied by at least one or more processors or a combination of at least one or more processors and software. Unlike the illustrated example, these components cannot be clearly divided with regard to a detailed operation.

The token generation unit 110, the named entity recognition unit 120, and the model training unit 130, which have been described with reference to FIG. 1, perform the same or similar function even in the additional embodiment of FIG. 2, and thus duplicate descriptions thereof will be omitted.

The masking processing unit 210 may replace at least some of the tokens, recognized as the named entities, with mask tokens.

According to an embodiment, the masking processing unit 210 may replace each token recognized as a named entity with the mask token according to a preset probability. In this case, a probability that each of the tokens recognized as the named entities is replaced with a mask token may be a hyper-parameter preset by a user.

According to another embodiment, the masking processing unit 210 may arbitrarily select a preset number of tokens from among the tokens recognized as the named entities, and may replace the selected tokens with the mask tokens.

According to another embodiment, the masking processing unit 210 can select a token to be replaced with the mask token on the basis of a type of each named entity token when a different named entity token status is assigned according to the type of each token recognized as the named entity.

Figure 3:
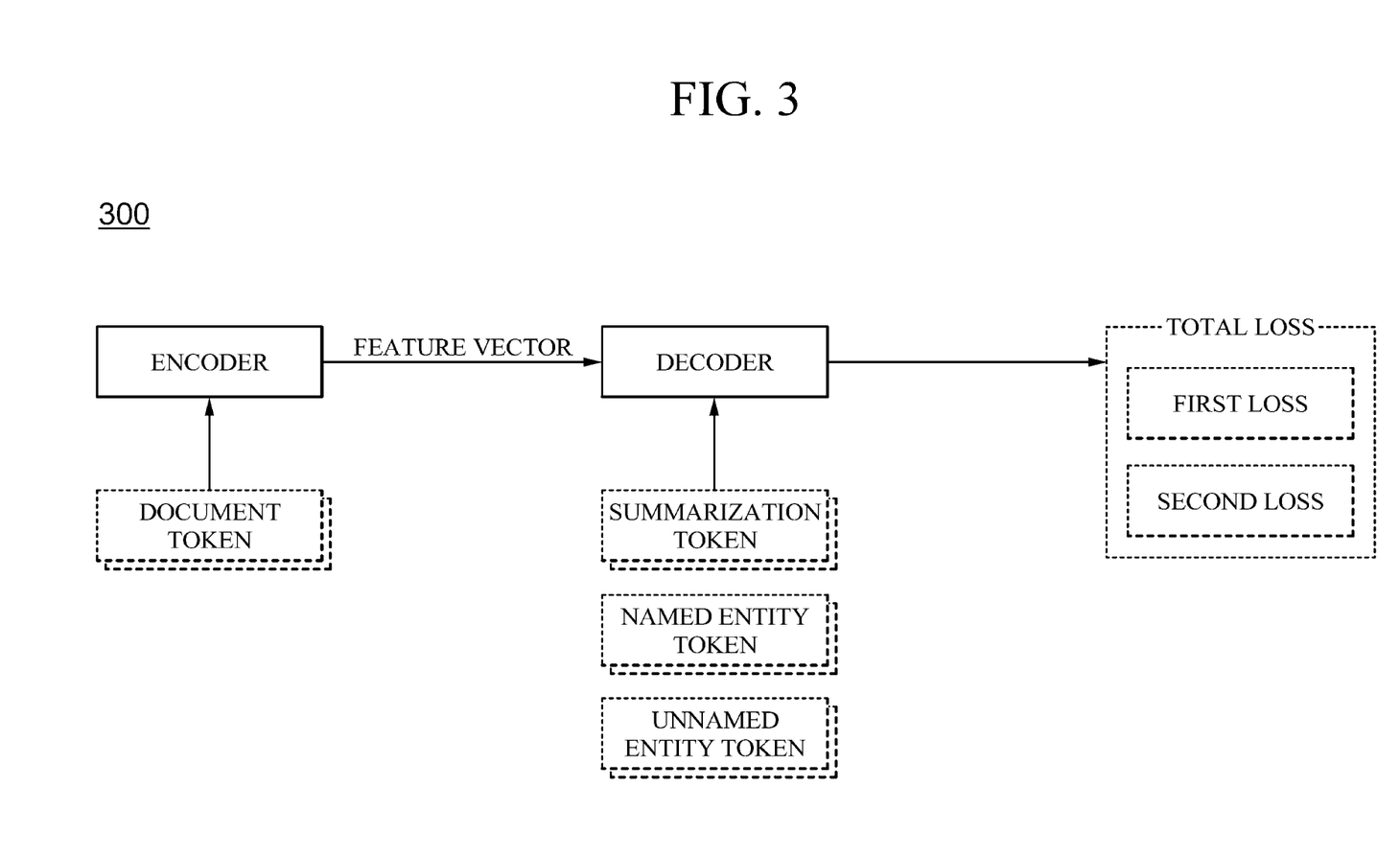
FIG. 3 is a view illustrating a data flow in a document summarization process according to an embodiment.

FIG. 3 is an exemplary view 300 illustrating a data flow in a document summarization process according to an embodiment.

Referring to FIG. 3, a plurality of document tokens, which are subjected to tokenization of the document data, are input into the encoder inside the document summarization model.

Afterwards, a plurality of feature vectors, which transform the plurality of document tokens at the encoder, are transmitted to the decoder within the document summarization model.

Meanwhile, the plurality of summarization tokens in which the summarization data is tokenized, the named entity token status assigned to the token recognized as the named entity among the summarization tokens, and the non-named entity token status assigned to the other token recognized as the non-named entity among the summarization tokens are input into the decoder.

Afterwards, according to the loss function that is preset on the basis of the plurality of feature vectors, the plurality of summarization tokens, the named entity token, and the non-named entity token, the first loss and the second loss are calculated. Next, the decoder calculates a total loss by means of a weighed sum of the first loss and the second loss.

Figure 4:
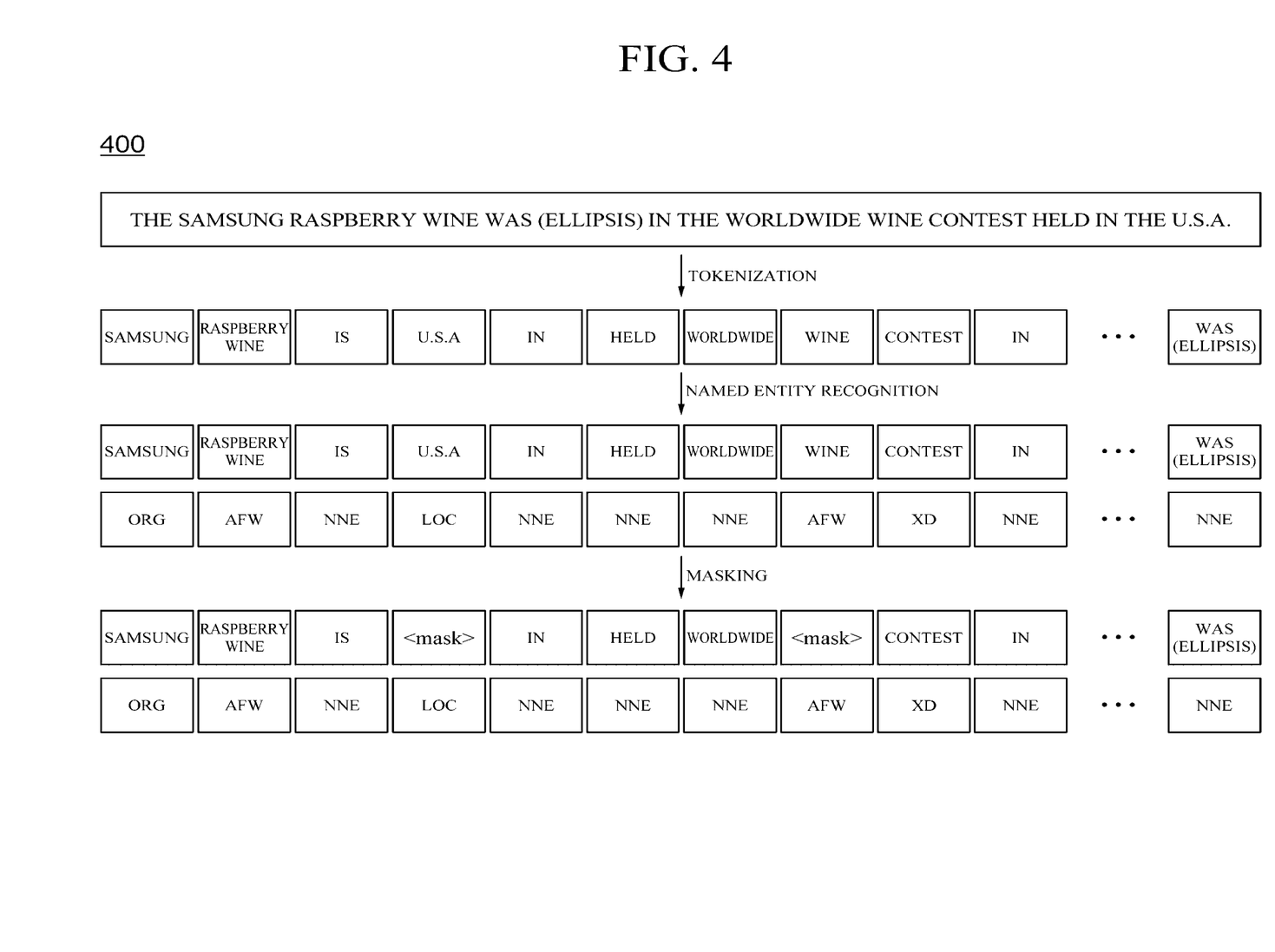
FIG. 4 is an exemplary view illustrating a tokenizing process, a named entity recognizing process, and a masking process according to an embodiment.

FIG. 4 is an exemplary view 400 illustrating a tokenizing process, a named entity recognizing process, and a masking process according to an embodiment.

First, a sentence, illustrated in the top of FIG. 4, that "a SAMSUNG raspberry wine was (ellipsis) in a worldwide wine contest held in the U.S.A.", is input, as the summarization data, into the apparatus 100 or 200 for training a document summarization model.

Afterwards, the apparatus 100 or 200 for training a document summarization model performs tokenization on the summarization data as described above, and generates a plurality of summarization tokens ('SAMSUNG', 'raspberry wine', 'is', 'U.S.A.', 'in', 'held', 'worldwide', 'wine', 'contest', 'in', 'was (ellipsis)') (tokenization).

Subsequently, the apparatus 100 or 200 for training a document summarization model performs the named entity recognition on the generated summarization tokens, and assigns tokens ('SAMSUNG', 'raspberry wine', 'U.S.A.', 'wine', 'contest'), which are relatively important and thus should not be changed in the summarization document (the named entity recognition).

In this case, the apparatus 100 or 200 for training a document summarization model subdivides the five types of tokens, assigns the named entity token 'ORG' to the token 'SAMSUNG' indicating an organization; assigns the named entity token 'AFW' to the token 'raspberry wine' and the token 'wine', assigns the named entity token 'LOC' to the token 'U.S.A.'; and assigns the named entity token status 'XD' to the token 'contest'.

Thereafter, as described above, the apparatus 100 or 200 for training a document summarization model replaces at least some of the five tokens recognized as the named entity with the mask token (Masking). To be specific, referring to FIG. 4, it can be seen that the token 'U.S.A.' and the token 'wine' are replaced with the mask tokens.

As a result, since the document summarization model is trained to analogize an original token ('U.S.A.' or 'wine') corresponding to a position of the mask token from the document data provided to the encoder, the document summarization model is trained by focusing on the document data provided to the encoder rather than a training experience of the decoder, and thereby factual consistency can be improved.

Figure 5:
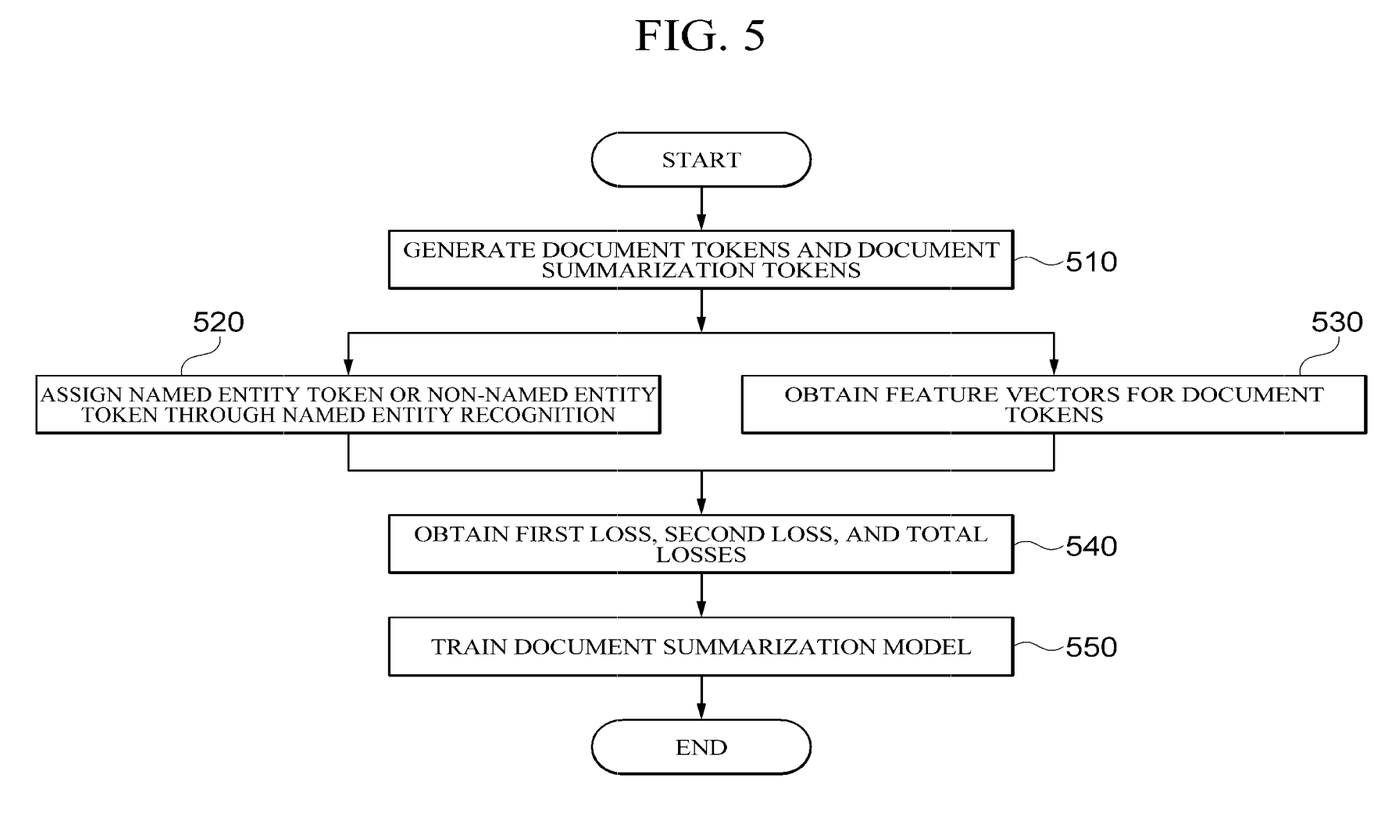
FIG. 5 is a flow chart illustrating a method of training a document summarization model according to an embodiment.

FIG. 5 is a flow chart for illustrating a method of training a document summarization model according to an embodiment.

The method illustrated in FIG. 5 can be conducted, for instance, by the aforementioned apparatus 100 for training a document summarization model.

First, the apparatus 100 for training a document summarization model generates a plurality of document tokens corresponding to the document data and a plurality of summarization tokens corresponding to the summarization data for the document data (510).

Afterwards, the apparatus 100 for training a document summarization model assigns the named entity token status to the summarization token recognized as the named entity among the plurality of summarization tokens through the named entity recognition, and assigns the non-named entity token status to the other tokens (520).

Meanwhile, the apparatus 100 for training a document summarization model inputs the plurality of document tokens into the encoder within the document summarization model, and obtains a plurality of feature vectors (530).

The aforementioned step 520 is a step performed on the summarization token, and the aforementioned step 530 is a step performed on the document tokens. The steps 520 and 530 can be independently performed without restraint on the order thereof.

Afterwards, the apparatus 100 for training a document summarization model inputs the plurality of feature vectors, the plurality of summarization tokens, the named entity token, and the non-named entity token into the decoder inside the document summarization model, and obtains a first loss that is relevant to the token recognized as the named entity, a second loss that is relevant to the other tokens, and a total loss obtained by summing up the first loss and the second loss using a weight value (540).

Afterwards, the apparatus 100 for training a document summarization model trains the document summarization model on the basis of the total loss (550).

In the illustrated flow chart, the above method has been described while being divided into a plurality of steps. In the above method, at least some of the steps may be performed in a changed order, performed together in combination with the other steps, omitted, performed in division into sub-steps, or performed in addition to one or more steps that are not illustrated.

Figure 6:
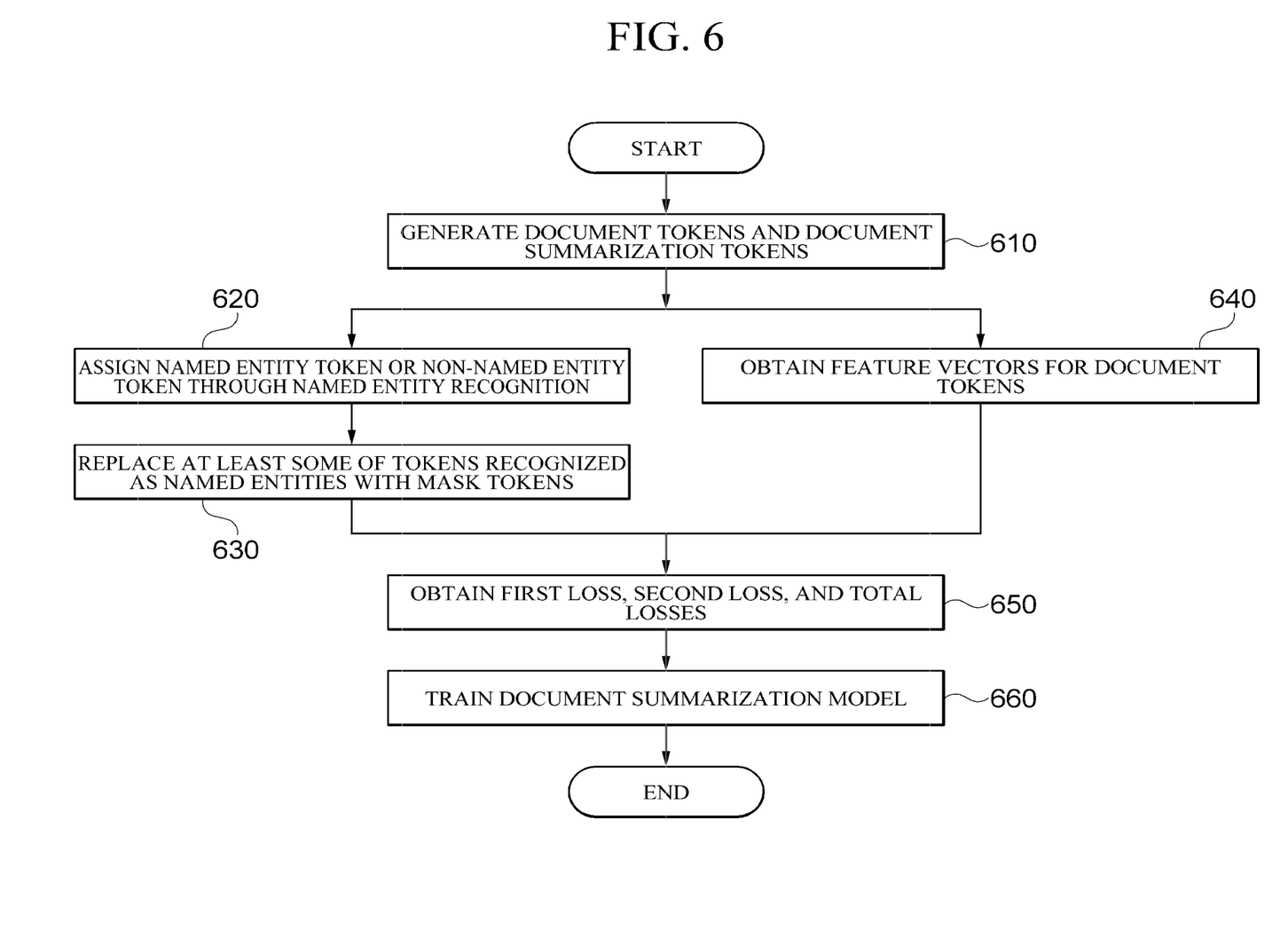
FIG. 6 is a flow chart illustrating a method of training a document summarization model according to an additional embodiment.

FIG. 6 is a flow chart for illustrating a method of training a document summarization model according to an additional embodiment.

The method illustrated in FIG. 6 may be performed by the aforementioned apparatus 200 for training a document summarization model.

First, the apparatus 200 for training a document summarization model generates a plurality of document tokens corresponding to document data, and a plurality of summarization tokens corresponding to the summarization data for the document data (610). Afterwards, the apparatus 200 for training a document summarization model assigns the named entity token status to a token recognized as the named entity among the plurality of summarization tokens through the named entity recognition, and assigns the non-named entity token status to the other token (620).

Subsequently, the apparatus 200 for training a document summarization model replaces at least some of the tokens recognized as the named entities with the mask tokens (630).

Meanwhile, the apparatus 200 for training a document summarization model inputs a plurality of document tokens into an encoder within the document summarization model, and obtains a plurality of feature vectors (640).

The above steps 620 and 630 are steps performed on the summarization token, and the step 640 is a step performed on the document tokens. Thus, the steps 620 and 640 or the steps 630 and 640 can be independently performed without restriction on the order.

Afterwards, the apparatus 200 for training a document summarization model inputs a plurality of feature vectors obtained through the step 640 and a plurality of summarization tokens, named entity tokens, and non-named entity tokens, at least some of which are placed by the mask tokens into the decoder within the document summarization model, and obtains the first loss related to the token recognized as the named entity, the second loss related to the other token, and the total loss in which the first loss and the second loss are summed on the basis of a weighted value (650).

Afterwards, the apparatus 200 for training a document summarization model trains the document summarization model on the basis of the total loss (660).

In the illustrated flow chart, the above method has been described while being divided into a plurality of steps. In the above method, at least some of the steps may be performed in a changed order or together in combination with the other steps, or performed by dividing into sub-steps, or performed by adding one or more steps that are not illustrated.

Figure 7:
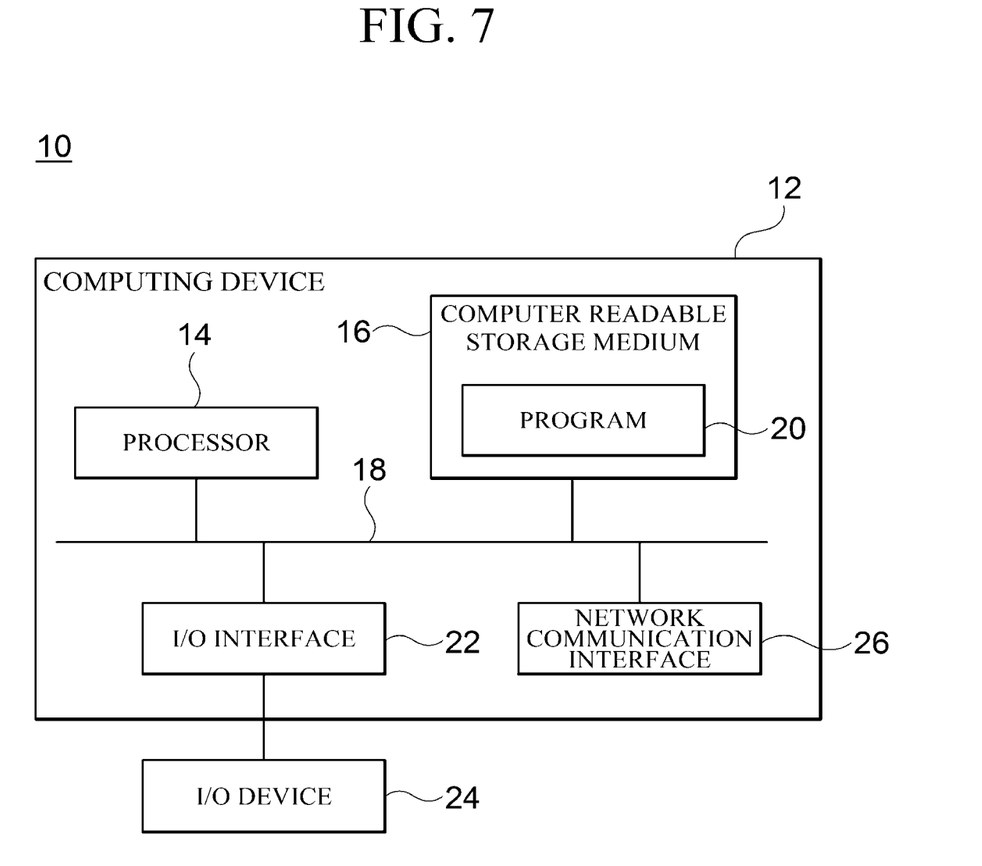
FIG. 7 is a block diagram illustrating a computing environment including a computing device according to an embodiment.

FIG. 7 is a block diagram illustrating a computing environment 10 including a computing apparatus according to an embodiment. In the illustrated embodiment, each component may have a function and capability different from those to be described below, and additional components not described below may be included.

The illustrated computing environment 10 includes a computing device 12. According to an embodiment, the computing device 12 may be an apparatus 100 for training a document summarization model. In addition, the computing device 12 may be an apparatus 200 for training a document summarization model according to another embodiment.

The computing device 12 includes at least one processor 14, a computer readable storage medium 16, and a communication bus 18. The processor 14 may allow the computing device 12 to operate according to the example embodiments described above. For example, the processor 14 may execute one or more programs stored in the computer readable storage medium 16. The one or more programs may include one or more computer executable instructions. The computer executable instructions may be configured to allow the computing device 12 to perform the operations according to the example embodiments when executed by the processor 14.

The computer readable storage medium 16 may be configured to store computer executable instructions, program codes, program data, and/or other suitable forms of information. A program 20 stored in the computer readable storage medium 16 may include a set of instructions executable by the processor 14. According to an embodiment, the computer readable storage medium 16 may be a memory (e.g., a volatile memory such as a random access memory (RAM), a non-volatile memory, or a combination thereof), one or more magnetic disk storage devices, optical disk storage devices, flash memory devices, other types of storage media which can be accessed by the computing device 12 and store intended information, or combinations thereof.

The communication bus 18 may include the processor 14 and the computer readable storage medium 16, and may interconnect various components of the computing device 12 to each other.

The computing device 12 may include one or more input/output (I/O) interfaces 22 providing an interface for one or more I/O devices 24 and one or more network communication interfaces 26. The I/O interface 22 and the network communication interfaces 26 may be connected to the communication bus 18. The I/O devices 24 may be connected to other components of the computing device 12 through the I/O interfaces 22. The I/O devices 24 may include input devices, such as a pointing device (e.g., a mouse and a track pad), a keyboard, a touch input device (e.g., a touch pad and a touch screen), a voice or sound input device, various types of sensors, and/or a capturing device, and/or output devices, such as a display device, a printer, a speaker, and/or a network card. Each of the I/O devices 24 may be one component constituting the computing device 12, may be included in the computing device 12, or may be connected to the computing device 12 as a device separate from the computing device 12.

The specific embodiments described herein may be implemented using hardware components, software components, and/or a combination thereof. For example, the apparatus, method, and components described in the foregoing embodiments may be realized using one or more general purpose computers or special purpose computers, such as a processor, a controller, an arithmetic logic unit (ALU), a digital signal processor, a microcomputer, a field programmable gate array (FPGA), a programmable logic unit (PLU), a microprocessor, and any other devices capable of executing and responding to instructions. The processing device may execute an operating system (OS) and one or more software applications that run on the OS. The processing device also may access, store, manipulate, process, and create data in response to execution of the software. For the sake of simplicity, the processing device used has been described as being singular. However, a person having ordinary skill in the art will appreciate that the processing device may include a plurality of processing elements and a plurality of types of processing elements. For example, the processing device may include a plurality of processors or a processor and a controller. In addition, different processing configurations, such as a parallel processor, are possible.

The software may include a computer program, codes, instructions, or at least one combination thereof. The software may configure the processing device or independently or collectively instruct the processing device to operate as intended. At least one of software and data may be embodied permanently or temporarily in any type of machine, component, physical or virtual equipment, computer storage medium or device, or a propagated signal wave in order to be interpreted by or provide instructions or data to the processing device. The software may also be distributed over network-coupled computer systems so as to be stored or executed in a distributed fashion. The software and data may be stored in one or more (non-transitory) computer readable recording media.

Although the exemplary embodiments of the present disclosure have been described in detail hereinabove, a person having ordinary knowledge in the technical field to which the present disclosure pertains will appreciate that various modifications are possible to the foregoing embodiments without departing from the scope of the present disclosure. Therefore, the scope of protection of the present disclosure shall not be limited to the foregoing embodiments but shall be defined by the appended Claims and equivalents thereof.

What is claimed is:

1. An apparatus for training document summarization model, the apparatus comprising:
    a token generation unit configured to generate a plurality of document tokens corresponding to document data and a plurality of summarization tokens corresponding to summarization data for the document data;
    a named entity recognition unit configured to assign a named entity token status to the summarization token, recognized as a named entity through named entity recognition (NER), from among the plurality of summarization tokens, and assign a non-named entity token status to the other tokens; and
    a model training unit configured to:
        obtain a plurality of feature vectors by inputting the plurality of document tokens into an encoder inside a document summarization model;
        obtain a first loss related to the token recognized as the named entity, a second loss related to the other tokens, and a total loss in which the first loss and the second loss are summed up using a weighted value by inputting the plurality of feature vectors, the plurality of summarization tokens, the named entity token, and the non-named entity token into a decoder inside the document summarization model; and
        train the document summarization model on the basis of the total loss.

2. The training model according to claim 1, wherein:
    the first loss is calculated by inputting a first token class, output from the decoder by inputting the feature vector for the token recognized as the named entity, the plurality of summarization tokens, and the named entity token, as well as a correct answer label for the token recognized as the named entity, as an input of a preset loss function; and
    the second loss is calculated by inputting a second token class, output from the decoder by setting feature vectors for the other tokens, the plurality of summarization tokens, and the non-named entity token, and the correct answer labels for the other tokens, as an input of the loss function.

3. The training model according to claim 1, wherein:
the named entity recognition unit is configured to subdivide the token recognized as the named entity into a plurality of types, and assign the named entity token status that is different according to each type; and
the first loss is calculated by summing up a plurality of losses, associated with each token subdivided according to each type, using a weighted value.

4. The training model according to claim 1, wherein the model training unit is configured to update training parameters of the encoder and training parameters of the decoder on the basis of the total loss.

5. The training model according to claim 1, further comprising a masking processing unit configured to replace at least a portion of the tokens, recognized as the named entities, with the mask token.

6. The training model according to claim 1, wherein the masking processing unit is configured to replace each of the tokens recognized as the named entities with the mask token according to a preset probability.

7. A method of training a document summarization model, the method comprising:
generating a plurality of document tokens corresponding to document data, and a plurality of summarization tokens corresponding to summarization data for the document data;
assigning a named entity token status to the summarization token, recognized as a named entity from among the plurality of summarization tokens, and assigning non-named entity token status to the other summarization tokens;
inputting the plurality of document tokens into an encoder within the document summarization model and obtaining a plurality of feature vectors;
inputting the plurality of feature vectors, the plurality of summarization tokens, the named entity token, and the non-named entity token into a decoder within the document summarization model, and obtaining a first loss related to the token recognized as the named entity, a second loss related to the other tokens, and a total loss in which the first loss and the second loss are summed up by a weight value; and
training the document summarization model on the basis of the total loss.

8. The method according to claim 7, wherein:
the first loss is calculated by inputting the first token class, output by inputting the feature vectors for the tokens recognized as the named entities, the plurality of summarization tokens, and the named entity tokens, and by inputting the correct answer labels for the tokens recognized as the named entities into a preset loss function; and
the second loss is calculated by inputting a second token class, output from the decoder by inputting the feature vectors for the other tokens, the plurality of summarization tokens, and the non-named entity tokens and by inputting the correct answer labels for the other tokens into the loss function.

9. The method according to claim 7, wherein:
the assigning of the token status comprises subdividing a type of the token recognized as the named entity into a plurality of numbers, and assigning the named entities that are different according to each type; and
the first loss is calculated by summing up a plurality of losses associated with the respective tokens subdivided according to each type using a weighted value.

10. The method according to claim 7, wherein the training of the document summarization model comprises updating training parameters of the encoder and training parameters of the decoder on the basis of the total losses.

11. The method according to claim 7 further comprises, after the assigning of the token status, replacing at least some recognized as the named entities with the mask tokens.

12. The method according to claim 11, wherein the replacement of the at least some recognized as the named entities with the mask tokens comprises replacing each of the tokens recognized as the named entities with the mask tokens according to a preset probability.

* * * * *